(12) United States Patent
Mehan

(10) Patent No.: US 7,363,521 B1
(45) Date of Patent: Apr. 22, 2008

(54) METHOD AND APPARATUS FOR REMOTE DEVICE CONTROL USING CONTROL SIGNALS SUPERIMPOSED OVER ETHERNET

(75) Inventor: Craig L. Mehan, Overland Park, KS (US)

(73) Assignee: Garmin Ltd., Cayman Islands ( * ) Notice: Subject to any disclaimer, the term of this patent is extended or adjusted under 35 U.S.C. 154(b) by 408 days.

(21) Appl. No.: 11/140,792

(22) Filed: May 31, 2005

(51) Int. Cl.
*G06F 1/00* (2006.01)

(52) U.S. Cl. .................................... 713/300
(58) Field of Classification Search ................. 713/300
See application file for complete search history.

(56) References Cited

U.S. PATENT DOCUMENTS

| | | | |
|---|---|---|---|
| 4,549,179 A * | 10/1985 | Stendardo | 340/825.69 |
| 6,507,273 B1 * | 1/2003 | Chang et al. | 340/3.1 |
| 6,640,308 B1 * | 10/2003 | Keyghobad et al. | 713/300 |
| 6,772,197 B1 * | 8/2004 | Lee et al. | 709/208 |
| 7,092,407 B2 * | 8/2006 | Ruhnow | 370/503 |
| 2006/0143583 A1 * | 6/2006 | Diab et al. | 716/4 |

* cited by examiner

*Primary Examiner*—Thomas Lee
*Assistant Examiner*—Jaweed A Abbaszadeh
(74) *Attorney, Agent, or Firm*—Kevin E. West; Samuel M. Korte

(57) ABSTRACT

A method and apparatus for remotely controlling a power state of devices comprises interconnecting, with an Ethernet cable, a first multi-function display (MFD) and at least one device for communicating with the first MFD. The first MFD comprises a switch for changing a power state. A power source provides power for the first MFD and the at least one device. The first MFD remotely controls the power state of the at least one device through a control signal output to the Ethernet cable. The at least one device receives the control signal and changes the power state of the at least one device in response to the control signal.

16 Claims, 3 Drawing Sheets

METHOD AND APPARATUS FOR REMOTE DEVICE CONTROL USING CONTROL SIGNALS SUPERIMPOSED OVER ETHERNET

BACKGROUND OF THE INVENTION

This invention relates generally to remotely controlling devices which are interconnected, and more particularly, to controlling devices interconnected with Ethernet cable.

Multiple sensors are often used aboard a marine craft to provide information to a user. Types of information may be weather, radar, or global positioning, for example. It is helpful to have the different types of information collected and, if possible, integrated together, then displayed on one or more devices. A small boat may utilize a single device for providing information, while larger craft may have multiple devices installed on more than one helm or at different locations on the craft.

The sensors and display devices typically run on battery power. To conserve battery power, such as when in a marina overnight, a user may want to turn off the battery powered devices. Some marine craft provide a breaker system which immediately removes power from one or more of the sensors and display devices. Often, however, the sensors and display devices must be individually turned off. If power is not removed, the battery may be drained when the user returns to the marine craft.

Some marine craft utilize a large number of sensors and display devices, creating a high level of difficulty with cabling, powering, and interfacing the different products which provide different types of information. In addition, the backlight of the display device consumes a large amount of power and has a limited life. Unfortunately, if power is removed from the display device the data which has been collected or received by the sensors is lost. Some forms of data, such as data received from a satellite, are time consuming to acquire and thus it is not advantageous to turn the display device off.

Therefore, a need exists for interconnecting and controlling the power state of multiple sensors and display devices. Certain embodiments of the present invention are intended to meet these needs and other objectives that will become apparent from the description and drawings set forth below.

BRIEF DESCRIPTION OF THE INVENTION

An apparatus for interconnecting and remotely controlling a power state of devices using an Ethernet cable comprises a first multi-function display (MFD). The first MFD comprises a switch for changing a power state. An Ethernet cable interconnects the first MFD and at least one device which communicates with the first MFD. A power source powers the first MFD and the at least one device, and the first MFD remotely controls a power state of the at least one device through a control signal output to the Ethernet cable.

A method for remotely controlling devices using an Ethernet cable comprises connecting a multi-function display (MFD) and at least one device with an Ethernet cable. The at least one device comprises a sensor. A power switch interconnected with the MFD is activated to change a power state of the MFD and the at least one device. A control signal is superimposed on the Ethernet cable and is received at the at least one device. A power state of the at least one device is changed in response to the control signal.

A system for remotely controlling a power state of interconnected components comprises a cable interconnecting multiple components. The multiple components further comprise a multi-function device (MFD) comprising a multiprocessor and a switch. The multiprocessor generates a control signal for remotely controlling a power state of the multiple components when the switch is activated.

The foregoing summary, as well as the following detailed description of certain embodiments of the present invention, will be better understood when read in conjunction with the appended drawings. It should be understood that the present invention is not limited to the arrangements and instrumentality shown in the attached drawings.

DETAILED DESCRIPTION OF THE INVENTION

Figure 1:
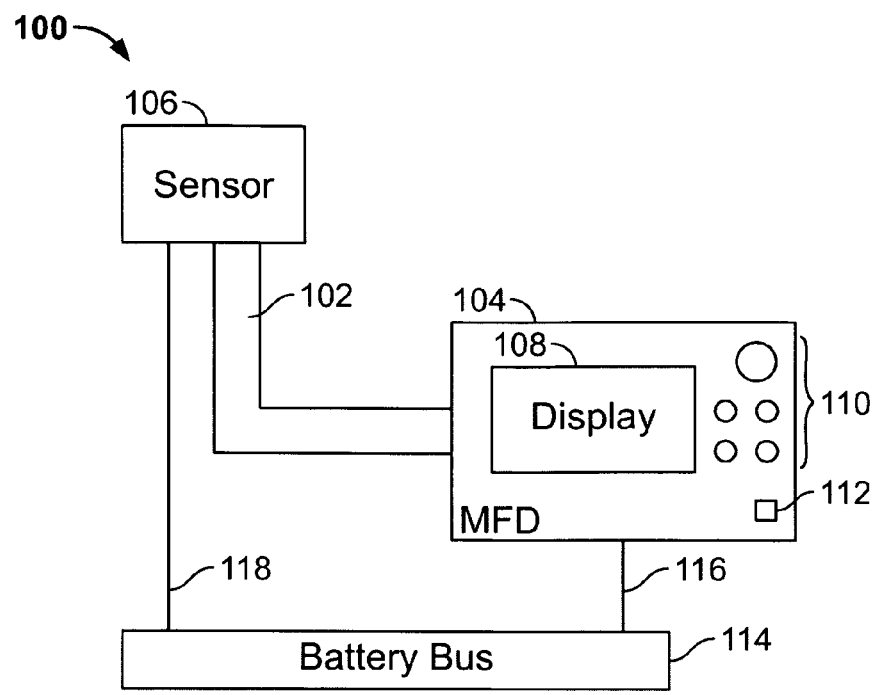
FIG. 1 illustrates a network having devices interconnected with an Ethernet cable in accordance with an embodiment of the present invention.

FIG. 1 illustrates a network 100 having devices interconnected with an Ethernet cable 102 in accordance with an embodiment of the present invention. The network 100 includes a multi-function display (MFD) 104 and a sensor 106 interconnected with the Ethernet cable 102. The MFD 104 and the sensor 106 are each connected to a ground and battery bus 114 by way of lines 116 and 118, respectively. It should be understood that one or more battery or power sources may be provided instead of the battery bus 114. Therefore, only two separate connections, a network connection and a power connection, need to be provided to each MFD 104 and sensor 106.

Some networks utilize IEEE 802.3af power over Ethernet, which superimposes power over the Ethernet cable to run devices connected to the Ethernet. Thus, if three devices are interconnected on a network with an Ethernet cable, one device can superimpose power over the Ethernet cable to supply the necessary power to the other two devices. However, one or more of the MFD 104 and sensor 106 have a power consumption level that is too large to allow use of the IEEE 802.3af design. Therefore, the devices, the MFD 104 and the sensor 106, connected to the Ethernet cable 102 are also connected to the battery bus 114 via lines 116 and 118.

The sensor 106 is a device which collects and sends information to the MFD 104. For example, the sensor 106 may be a global positioning device (GPS), a fish finder, marine radar, satellite radio receiver, and the like.

The MFD 104 has a display 108 and one or more buttons 110, knobs, switches, or other user interface capability to allow the user to select and input information, and to change the information displayed on the display 108. It should be understood that the buttons 110 illustrated on FIG. 1 are exemplary, and that more or less buttons 110 may be provided in different locations on the MFD 104. In addition, the display 108 may provide touch screen capability, allowing the user to select information directly on the screen using a finger or stylus, for example. The MFD 104 is used for charting, saving way points that indicate places of interest, and displaying information collected by the sensor 106, such as marine radar and weather.

Figure 2:
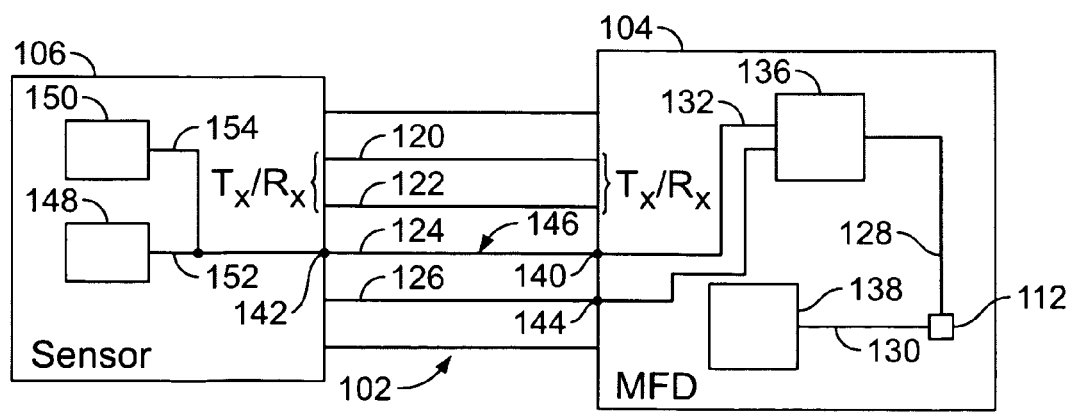
FIG. 2 illustrates the Ethernet cable, the MFD and the sensor of FIG. 1 in accordance with an embodiment of the present invention.

FIG. 2 illustrates the Ethernet cable 102, the MFD 104 and the sensor 106 of FIG. 1 in accordance with an embodiment of the present invention. The MFD 104 further comprises a microprocessor 136 for controlling the MFD 104, processing data, and the like. A switch 112 on the MFD 104 allows the user to change the power state of the MFD 104, the display 108, and the sensor 106. FIGS. 1 and 2 will be discussed together.

The Ethernet cable 102 is a standard Ethernet cable, allowing easy installation and repair for the user. There is no need to create custom cables or connectors. The Ethernet cable 102 may be 100base-T or 1000base-T, utilizing 4 pairs of twisted-pair wires 120-126. The network connection at the hardware level uses the OSI data link and physical layers of Ethernet, meaning that a standard Ethernet MAC IC (Media Access Controller, which formats/de-formats application data to Ethernet data link protocol) and PHY IC (electrical driver) can be used. It should be understood that other types of cables may also be used.

The MFD 104 and sensor 106 send and receive packets of information over the Ethernet cable 102 using transmit and receive wires, such as wires 120 and 122. The packets are addressed with a header identifying the intended recipient device. Therefore, the wires 124 and 126 are not used for data transmission.

The MFD 104 has a sensor power control output 140 which is connected to an available wire of the Ethernet cable 102, such as wire 124. The sensor 106 has a sensor power control input 142 which is connected to the same wire 124. The wire 124 may be referred to as a sensor power control line 146. The sensor power control line 146 is an open collector line. Therefore, more than one MFD 104 can be connected to the Ethernet cable 102 and activate the sensor power control line 146 without bus contention. The MFD 104 also has an MFD power control input/output (I/O) 144 connected to the second available wire 126 of the Ethernet cable 102. The MFD power control I/O 144 is bidirectional and will be discussed further below.

The microprocessor 136 and/or the power supply circuitry 138 sense when the switch 112 of the MFD 104 is activated by the user via lines 128 and 130, respectively. If the MFD 104 is not already powered on, the power supply circuitry 138 is activated and the MFD 104 is powered up. The microprocessor 136 sends a control signal to the sensor power control output 140 via line 132 and pulls the sensor power control line 146 low. The sensor power control line 146 will be held low by the MFD 104 as long as the MFD 104 is in the powered on state.

The sensor power control input 142 is connected to power supply circuitry 148 via line 152 within the sensor 106. When the sensor power control line 146 is pulled low, the low control signal activates the power supply circuitry 148 and the sensor 106 is powered up. Alternatively, the sensor 106 may also utilize a microprocessor 150 which monitors the sensor power control input 142 via line 154 in place of, or in addition to, the power supply circuitry 148.

Once the sensor 106 is powered on, the sensor 106 begins to collect data. The MFD 104 can display the collected data on the display 108 and allow input from the user via the buttons 110. The user may also input other information into the MFD 104, such as waypoints indicating places of interest.

When the network 100 is in the powered on state, the microprocessor 136 monitors the switch 112. If the switch 112 is pressed or activated, the microprocessor 136 displays a message on the display 108. The message requests input from the user to choose or identify whether the network 100, including the sensor 106 and the MFD 104, should be powered down, or whether just the display 108 of the MFD 104 should be turned off.

Using buttons 110, the user may select the option to turn the display 108 off to conserve power, extend the life of the display 108, or because the user currently does not need to access the displayed information. By choosing to turn only the display 108 off, the power is removed from the display 108, but the MFD 104 remains in a power on state, retains the information previously collected by the sensor 106 and continues to receive information from the sensor 106. The sensor 106 remains in a power on state.

When the display 108 is in the power off state, the microprocessor 136 continues to monitor the switch 112. When the switch 112 is activated, the microprocessor 136 initiates the restoration of power to the display 108.

Alternatively, the user may select the option to turn off the devices connected to the network 100. The microprocessor 136 initiates a power down sequence to change the MFD 104 to be in a power off state. The microprocessor 136 also sends a control signal to the sensor power control output 140 and releases the sensor power control line 146. The microprocessor 150 and/or power supply circuitry 148 of the sensor 150 senses the change in the sensor power control line 146 at the sensor power control input 142 and initiates a power down sequence, changing the power state of the sensor 106 to be a power off state.

It should be understood that the functionality of sensing the switch 112, initiating a change in power state of the MFD 104 and the sensor 106, and changing the power state of the display 108 may be accomplished by use of microprocessors 136 and 150, the power supply circuitry 138 and 148, and/or other hardware and software. Optionally, more than one switch 112 may be provided on each MFD 104, wherein a separate switch is used to control the power state of the display 108. Therefore, the functionality is not limited to the methods and apparatus discussed herein.

Figure 3:
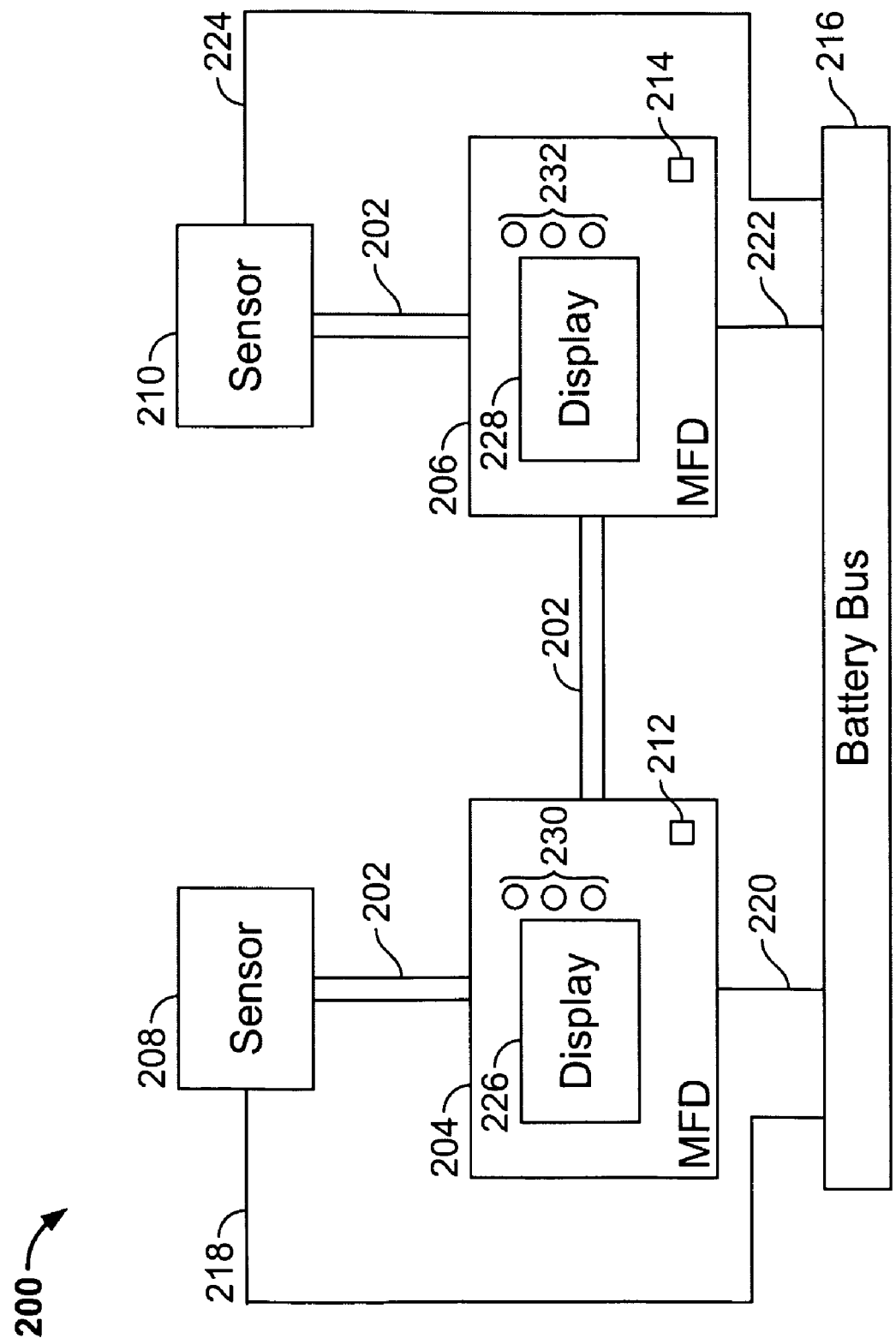
FIG. 3 illustrates a network having more than one MFD interconnected with an Ethernet cable in accordance with an embodiment of the present invention.

FIG. 3 illustrates a network 200 having more than one MFD interconnected with an Ethernet cable 202 in accordance with an embodiment of the present invention. The network 200 comprises two MFDs 204 and 206 and two sensors 208 and 210, each of which are connected to a ground and battery bus 216 via lines 220, 222, 218, and 224, respectively. The sensors 208 and 210 may each sense or receive different types of information. For example, the sensor 208 may be a fish finder and the sensor 210 may be a GPS.

Each of the MFDs 204 and 206 and the sensors 208 and 210 need only one power connection and one Ethernet connection to interconnect the devices with each other. Each MFD 204 and 206 connected to the Ethernet cable 202 can communicate with and control the sensors 208 and 210, such as by changing the range, gain, and the like.

Figure 4:
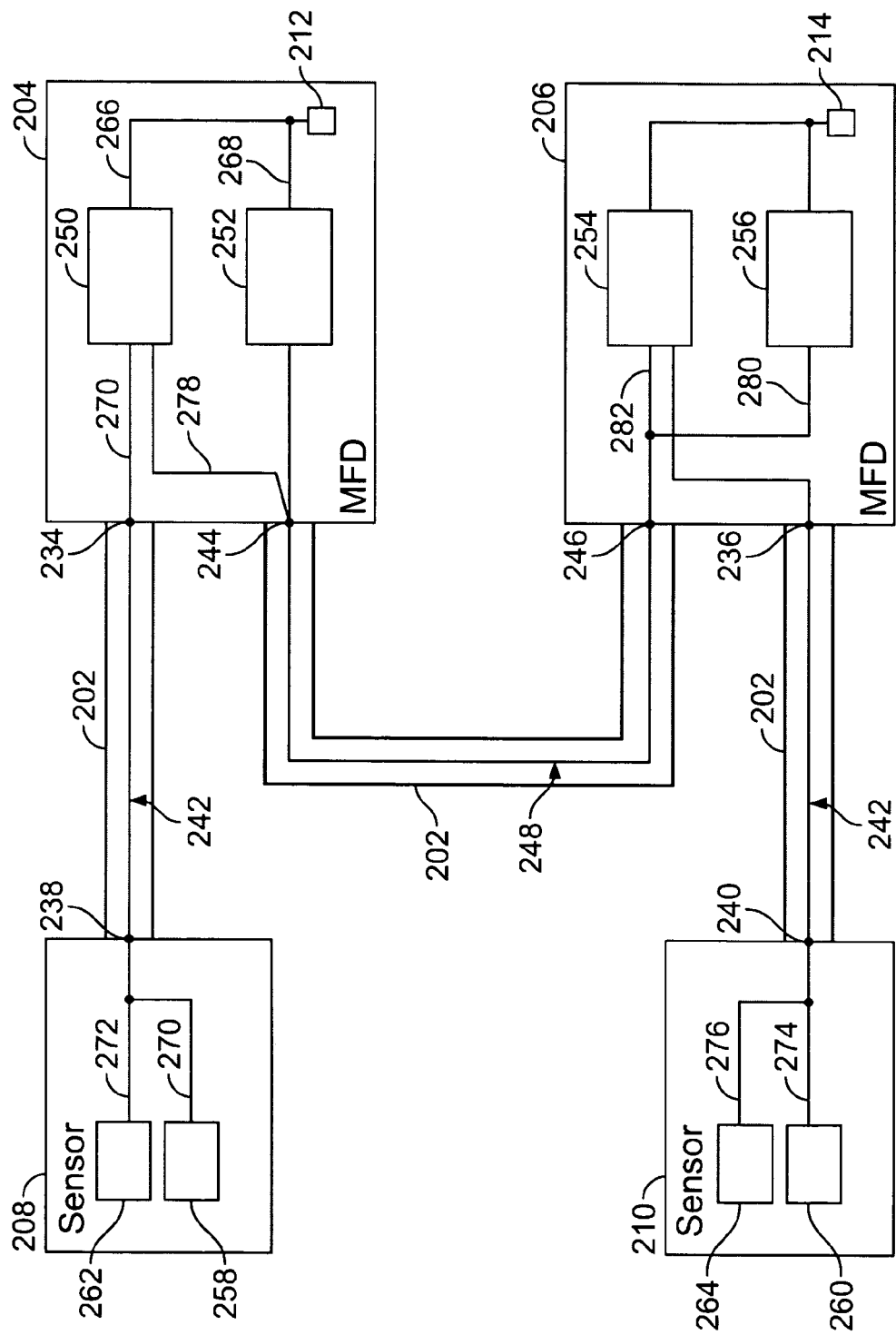
FIG. 4 illustrates the Ethernet cable, the MFDs, and the sensors of FIG. 3 in accordance with an embodiment of the present invention.

FIG. 4 illustrates the Ethernet cable 202, the MFDs 204 and 206, and the sensors 208 and 210 of FIG. 3 in accordance with an embodiment of the present invention. FIGS. 3 and 4 will be discussed together. Although not illustrated for clarity, it should be understood that the Ethernet cable 202 comprises 4 twisted-cable pairs as discussed previously and illustrated in FIG. 2.

Also, more MFDs and sensors may be installed on the network 200. For example, a user may wish to install an MFD on each of the fly bridge, the helm, the pilot house and stateroom, creating a network of multiple MFDs which share information. Also, a port expander (not shown) may be used to provide connectivity for multiple devices, and a receiver server (not shown) may be integrated with the network 200 to store large amounts of data.

The MFD 204 further comprises a display 226, buttons 230 for inputting information and changing the display 226, a microprocessor 250, and power supply circuitry 252. The MFD 206 further comprises a display 228, buttons 232 for input, a microprocessor 254, and power supply circuitry 256. The sensor 208 has a microprocessor 262 and power supply circuitry 258, and the sensor 210 has a microprocessor 264 and power supply circuitry 260.

The MFDs 204 and 206 each have a sensor power control output 234 and 236, respectively, which is connected to an available wire of the Ethernet cable 202, such as wire 124 (FIG. 2) of Ethernet cable 102 as discussed previously. This wire may be called a sensor power control line 242. The sensors 208 and 210 each have a sensor power control input 238 and 240, respectively, connected to the sensor power control line 242; the operation is the same as discussed previously in connection with the sensor power control line 146. That is, the sensor power control line 242 is an open collector line. Therefore, each of the MFDs 204 and 206 can connect to and activate the sensor power control line 242 without bus contention.

In addition, the sensors 208 and 210 may have circuitry to prevent the sensors 208 and 210 from powering on when leakage current is present. By way of example only, multiple MFDs may output leakage current, such as when at a high temperature. Therefore, a minimum current limit on the sensor power control line 242 may be set to protect the sensors 208 and 210 from inadvertent power on. The minimum current limit may be a preset limit, such as 1 mA, or may be based on the number of components within the system 200.

The MFDs 204 and 206 each have a bidirectional MFD power control input/output (I/O) 244 and 246, respectively, which is connected to the second available wire of the Ethernet cable 202. The wire may be referred to as an MFD power control line 248.

The power state of the network 200 may be changed by either of the MFDs 204 and 206. Therefore, when the network 200 is in a power off state, activating either the switch 212 of MFD 204 or switch 214 of MFD 206 initiates power up sequences within the components connected to the Ethernet cable 202. Therefore, the following discussion will utilize MFD 204, but it should be understood that the discussion applies equally to MFD 206.

The microprocessor 250 and/or power supply circuitry 252 sense when the switch 212 of the MFD 204 is activated by the user via lines 266 and 268, respectively. The power supply circuitry 252 is activated and the MFD 204 is powered up. The microprocessor 250 sends a control signal to the sensor power control output 234 via line 270 and pulls the sensor power control line 242 low. The microprocessor 250 may send the control signal either as the MFD 204 is powering up or after the MFD 204 is completely powered on. The sensor power control line 242 will be held low by the MFD 204 as long as the MFD 204 is in the powered on state.

The sensor power control input 238 is connected to power supply circuitry 258 and/or microprocessor 262 within the sensor 208 via lines 270 and 272, and the sensor power control input 240 is connected to power supply circuitry 260 and/or microprocessor 264 within the sensor 210 via lines 274 and 276. When the sensor power control line 242 is pulled low, the low control signal activates the power supply circuitries 258 and 260 and the sensors 208 and 210 are powered up.

At the same time as the MFD 204 is initiating its power up sequence and outputting the control signal on the sensor power control line 242, the microprocessor 250 outputs a control signal to the MFD power control I/O 244 via line 278. The MFD power control line 248 is an open collector line so that each MFD 204 and 206 connected to the Ethernet cable 202 can connect and activate the MFD power control line 248 without bus contention.

The MFD power control I/O 244 holds the MFD power control line 248 low for a first predefined period of time and then allows the MFD power control line 248 to go open. By way of example only, the MFD power control line 248 may be held low for 2 seconds to superimpose the control signal over the Ethernet cable 202.

The MFD power control I/O 246 of MFD 206 is connected to the power supply circuitry 256 via line 280 and the microprocessor 254 via line 282. The low control signal on the MFD power control line 248 activates the power supply circuitry 256 to initiate a power up sequence. If the MFD power control line 248 is held low for a period of time outside the tolerance of the first predefined period of time, the power supply circuitry 256 may not initiate the power up sequence. By way of example only, the power supply circuitry 256 may have a requirement to sense a low control signal on the MFD power control line 248 of at least 0.75 seconds prior to initiating the power up sequence.

As the microprocessors 250 and 254 sense the MFD power control line 248 via MFD power control I/O 244 and 246, respectively, the MFDs 204 and 206 can identify whether the power change sequence has been initiated at the same MFD or remotely, from a different MFD. If the MFD, such as MFD 206, senses that another MFD, such as MFD 204, has initiated the power change sequence, the MFD 206 will power on and the microprocessor 254 will maintain the display 228 in an off state, such as in a sleep mode. Therefore, the MFD 206 will be accessing and/or receiving available information, such as weather data and GPS data collected from the sensors 208 and 210, in addition to waypoints and other information entered on other MFDs. The information will be available to a user immediately if the user wishes to power on the display 228 and access the data from the MFD 206. In addition, a power savings is realized by not powering on the display 228 when the display 228 is not needed.

While the network 200 is in the powered on state, the microprocessors 250 and 254 continue to monitor the switches 212 and 214, respectively. If the switch 212 of MFD 204 is activated, the microprocessor 250 displays a message on the display 226, as discussed previously. If the user selects the option to turn the display 226 off, the power is removed from the backlight (not shown) of the display 226 while the MFD 204 remains in a power on state. The power state of the other MFDs and sensors connected to the Ethernet cable 202 remains the same, or in the power on state.

Similarly, if the network 200 is in the powered on state and one or more of the displays 226 and 228 are powered off, the microprocessors 250 and 254 continue to monitor the switches 212 and 214. When the switch 212 or 214 is activated, the microprocessor 250 or 254 initiates the power to be immediately restored to the associated display 226 or 228. There is no need to wait for the components of the network 200 to power up and gather information.

Therefore, a user has the capability of turning the displays 226 and 228 on and off as needed as the user moves to different areas of the marine craft, but does not lose the information which has been gathered by the sensors 208 and 210, or additional data or waypoints which have been entered at one or more MFDs 208 and 210. Therefore, it should be understood that while the network 200 is in the powered on state, one, more than one, or no displays 226 and 228 may be powered on. By being able to turn the displays 226 and 228 off individually, a significant power savings can be realized without the inconvenience of losing acquired and entered data.

The network 200 may be turned off from any MFD 204 and 206 connected to the Ethernet cable 202. As discussed previously, the microprocessors 250 and 254 continue to monitor the switches 212 and 214, respectively, while the network 200 is in the powered on state. When the switch 212 of MFD 204 is activated, the microprocessor 250 displays a message on the display 226, as discussed previously. If the user selects the option to turn the network 200 off, the microprocessor 250 initiates a power down sequence to change the MFD 204 to be in a power off state. As discussed previously with FIGS. 1 and 2, the microprocessor 250 sends a control signal to the sensor power control output 234 via line 270 and releases the sensor power control line 242. The power supply circuitry 258 and 260 and/or microprocessors 262 and 264 of the sensors 208 and 210 sense the change in the sensor power control line 242 at sensor power control inputs 238 and 240, and initiate a power down sequence to change each of the sensors 208 and 210 to be in a power off state. Therefore, there is no need for the user to turn each of the sensors 208 and 210 off individually, or to wonder whether any sensor was left on by mistake.

The microprocessor 250 sends a control signal to the MFD power control I/O 244 via line 278, and the MFD power control I/O 244 holds the MFD power control line 248 low for a second predefined period of time, which is different with respect to the first predefined period of time. The microprocessor 250 then allows the MFD power control line 248 to go open. By way of example only, the MFD power control line 248 may be held low for 0.25 seconds.

The microprocessor 254 and/or power supply 256 of MFD 206 monitors the MFD power control I/O 246. When a low control signal is sensed for the second predefined period of time, or within a range based on the second predefined period of time, at the MFD power control I/O 246, the microprocessor 254 of the MFD 206 initiates a power down sequence. For example, when the microprocessor 254 senses a low control signal within a range of 0.1-0.4 seconds on the MFD power control line 248, the microprocessor 254 will initiate the power down sequence. If the microprocessor 254 senses a low control signal on the MFD power control line 248 lasting less than 0.1 second or longer than 0.4 seconds, the power down sequence is not initiated. Thus, the user does not have to turn each MFD 204 and 206 off individually, but can remotely control the power state of each MFD 204 and 206 from whichever MFD unit is convenient.

If an MFD is in a power state different from the rest of the network 200, the MFD may be brought into synchronization when the power state of the network 200 is changed. For example, MFD 206 is in a power off state while MFD 204 and sensors 208 and 210 are in a power on state. If the switch 214 of MFD 206 is activated, the microprocessor 254 outputs control signals to the sensor power control line 242 and the MFD power control line 248 to initiate a power up sequence in the sensors 208 and 210 and the MFD 204. The sensor power control line 242 is already being held low by the MFD 204 which is powered on. The microprocessor 250 of the MFD 204 receives the control signal on the MFD power control I/O 244, which is the low control signal held for the first predefined period of time. The microprocessor 250 does not initiate any action to change the power state of MFD 204 as the MFD 204 is already in the power on state.

Therefore, all of the devices connected to the Ethernet cable 202 can be remotely turned on and off at one time from one location, preventing a device from being unintentionally left in the powered on state, which may completely discharge the battery. In other words, the power may be removed from the network 200 by activating the power switch of any MFD connected to the Ethernet cable 202, then choosing the appropriate option on the display.

While the invention has been described in terms of various specific embodiments, those skilled in the art will recognize that the invention can be practiced with modification within the spirit and scope of the claims.

What is claimed is:

1. Apparatus for interconnecting and remotely controlling a power state of devices using an Ethernet cable, comprising:
    a first multi-function display (MFD) comprising a switch for changing a power state;
    at least one device for communicating with said first MFD;
    a power source for powering said first MFD and said at least one device; and
    an Ethernet cable for interconnecting said first MFD and said at least one device, said first MFD remotely controlling a power state of said at least one device through a control signal output to said Ethernet cable, said control signal not providing power to said at least one device,
    wherein said at least one device comprises a second MFD, said second MFD further comprising—
    an input for receiving said control signal, and
    power supply circuitry being in communication with said input, wherein said control signal being a pulse held for a predetermined period of time, said control signal initiating one of a power down sequence and a power up sequence within said power supply circuitry to power off and power on, respectively, said second MFD.

2. The apparatus of claim 1, wherein said at least one device being one of a second MFD, a satellite radio receiver, a fish finder, a radar, and a GPS.

3. The apparatus of claim 1, wherein said at least one device being a second MFD comprising a display, said control signal initiating a power up sequence to power on said second MFD, said display remaining in a power off state.

4. The apparatus of claim 1, wherein said first MFD further comprises a display, said switch being configured to change a power state of said display without changing a power state of said first MFD.

5. The apparatus of claim 1, wherein said first MFD and said at least one device having a power input for connecting to said power source.

6. The apparatus of claim 1, said Ethernet cable being one of 100baseT standard or 1000baseT standard.

7. A method for remotely controlling devices using an Ethernet cable, comprising:
    connecting a multi-function display (MFD) and at least one device with an Ethernet cable, said at least one device comprising a sensor;

activating a power switch interconnected with said MFD to change a power state of said at least one device;

superimposing a control signal on said Ethernet cable;

receiving said control signal at said at least one device, said control signal not providing power to said at least one device; and changing a power state of said at least one device in response to said control signal, said at least one device further comprising a second MFD, said control signal being a pulse held for a predetermined period of time, said control signal initiating one of a power down sequence and a power up sequence to power off and power on, respectively, said second MFD.

8. The method of claim 7, further comprising;

receiving data with said sensor; and outputting said data on said Ethernet cable, said MFD receiving said data.

9. The method of claim 7, said at least one device further comprising a second MFD having a display, said method further comprising powering on said second MFD in response to said control signal, said display remaining in a power off state.

10. The method of claim 7, further comprising requesting an input defining whether a power state of a display within said MFD is to be changed or a power state of said at least one device is to be changed.

11. The method of claim 7, further comprising:

activating said power switch; and changing a power state of a display within said MFD while maintaining said power state of said MFD and said at least one device.

12. A system for remotely controlling a power state of interconnected components, comprising:

a cable interconnecting multiple components;

said multiple components further comprising a multi-function display (MFD) comprising a multiprocessor and a switch, said multiprocessor generating a control signal for remotely controlling a power state of said multiple components when said switch is activated, said multiprocessor outputting said control signal on said cable and said control signal not providing power to said multiple components, said multiple components further comprising a second MFD, said control signal being a pulse held for a predetermined period of time, said control signal initiating one of a power down sequence and a power up sequence to power off and power on, respectively, said second MFD.

13. The system of claim 12, said multiple components further comprising a sensor, said sensor comprising:

an input for receiving said control signal; and power supply circuitry for sensing said input, said power supply circuitry performing one of a power up sequence and a power down sequence in response to said control signal.

14. The system of claim 12, said cable further comprising:

a wire for carrying a first control signal for controlling a power state of a first set of said multiple components; and a second wire for carrying a second control signal for controlling a power state of a second set of said multiple components.

15. The system of claim 12, further comprising a second cable for interconnecting said multiple components with an external power source.

16. The system of claim 12, said MFD further comprising:

an input/output for sending and receiving said control signal;

a display for displaying data; and power supply circuitry for powering up and powering down said MFD, said multiprocessor monitoring said switch, said multiprocessor commanding said power supply circuitry to change a power state of said display when said switch is activated.

* * * * *